US008410978B2

(12) United States Patent
Sakai et al.

(10) Patent No.: US 8,410,978 B2
(45) Date of Patent: Apr. 2, 2013

(54) SHAPE MEASUREMENT INSTRUMENT AND SHAPE MEASUREMENT METHOD

(75) Inventors: Hiroyuki Sakai, Kyoto (JP); Takeshi Fukuda, Osaka (JP); Takuya Sakamoto, Kyoto (JP); Toru Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 604 days.

(21) Appl. No.: 12/597,875

(22) PCT Filed: Apr. 17, 2008

(86) PCT No.: PCT/JP2008/001017
§ 371 (c)(1),
(2), (4) Date: Oct. 27, 2009

(87) PCT Pub. No.: WO2008/139687
PCT Pub. Date: Nov. 20, 2008

(65) Prior Publication Data
US 2010/0127916 A1 May 27, 2010

(30) Foreign Application Priority Data

Apr. 27, 2007 (JP) ................. 2007-119101
May 21, 2007 (JP) ................. 2007-133957

(51) Int. Cl.
*G01S 13/89* (2006.01)
(52) U.S. Cl. ........... 342/189; 342/59; 342/135; 342/145
(58) Field of Classification Search .................... 342/189
See application file for complete search history.

(56) References Cited

U.S. PATENT DOCUMENTS 6,664,918 B2 * 12/2003 Paradie et al. .................. 342/70
6,697,012 B2 *  2/2004 Lodwig et al. ................ 342/120
(Continued)

FOREIGN PATENT DOCUMENTS

JP           11-052053         2/1999
JP         2000-009833         1/2000
(Continued)

OTHER PUBLICATIONS

Kidera et al. "An Accurate Imaging Algorithm with Scattered Waveform Estimation for UWB Pulse Radars".IEICE Trans. Commun., vol. E89-B, No. 9, pp. 2588-2595. Sep. 2006.*

(Continued)

*Primary Examiner* — John B Sotomayor
*Assistant Examiner* — Matthew M Barker
(74) *Attorney, Agent, or Firm* — McDermott Will & Emery LLP

(57) ABSTRACT

A shape measurement instrument includes a plurality of transmitters 1 to 4 which radiate signals having different waveforms or phases, receivers 31 to 34 which receive signals reflected from an object O, correlation units 41 to 44 which obtain correlation waveforms between waveforms of the signals received by the receivers 31 to 34, and the signal radiated by a transmitter radiating the received signal of the transmitters 1 to 4, and a shape estimation unit 5 which extracts a quasi-wavefront based on the correlation waveforms obtained by the correlation units 41 to 44 and estimates a shape of the object O based on a relationship between the quasi-wavefront and the object O. As a result, a period of time required to measure an object shape can be significantly reduced.

16 Claims, 8 Drawing Sheets

U.S. PATENT DOCUMENTS

| | | | | |
|---|---|---|---|---|
| 6,922,145 | B2* | 7/2005 | Piesinger | 340/541 |
| 7,081,850 | B2* | 7/2006 | Small | 342/194 |
| 7,269,198 | B1* | 9/2007 | Elliott et al. | 375/130 |
| 7,345,625 | B1* | 3/2008 | Urkowitz | 342/174 |
| 7,589,665 | B2* | 9/2009 | Heide et al. | 342/127 |
| 8,089,396 | B2* | 1/2012 | Beeri et al. | 342/179 |
| 2006/0114146 | A1* | 6/2006 | Lindenmeier et al. | 342/125 |

FOREIGN PATENT DOCUMENTS

| | | |
|---|---|---|
| JP | 2000-088944 | 3/2000 |
| JP | 2005-331466 | 12/2005 |
| JP | 2006-343205 | 12/2006 |

OTHER PUBLICATIONS

Shouhei Kidera et al., "A High-resolution 3D Imaging algorithm with linear array antennas for UWB pulse radar systems," IEEE AP-S International Symposium, USNC/URSI National Radio Science Meeting, AMEREM Meeting, 2006, 1057-1060.

Takuya Sakamoto et al., "An Experimental Study on a Fast algorithm for UWB Pulse Radars," The Transactions of the Institute of Electronics, Information and Communication Engineers B, vol. J90-B No. 1, pp. 63-73, 2007 with full English Translation.

Takuya Sakamoto et al., "A Nonparametric Target Shape Estimation Algorithm for UWB Pulse Radar Systems," Technical Report of IEICE, A P-2003-36, vol. 103, No. 120, pp. 1-6, 2003.

Takuya Sakamoto et al., A Target Shape Estimation Algorithm for Pulse Radar Systems based on Boundary Scattering Transform,: IEICE Transaction on Communication, OVl. E87-B, No. 5, 2004, pp. 1357-1365.

Shouhei Kidera et al., "A Fast Imaging Algorithm with Bi-static Antenna for UWB Pulse Radar Systems," 34th Electromagnetic Theory Symposium of IEICE, EMT-05-58, 2005.

Takuya Sakamoto et al., :"A Phase Compensation Algorithm for High-Resolution Shape Estimation Algorithms with Pulse Radars," Technical Report of IEICE, A P2004-72, vol. 104, No. 202, pp. 37-42, 2004.

* cited by examiner

SHAPE MEASUREMENT INSTRUMENT AND SHAPE MEASUREMENT METHOD

RELATED APPLICATIONS

This application is the U.S. National Phase under 35 U.S.C. §371 of International Application No. PCT/JP2008/001017, filed on Apr. 17, 2008, which in turn claims the benefit of Japanese Application Nos. 2007-119101, filed on Apr. 27, 2007 and 2007-133957, filed on May 21, 2007, the disclosures of which Applications are incorporated by reference herein.

TECHNICAL FIELD

The present invention relates to a shape measurement instrument for measuring a shape of a target object by radiating a transmission signal and receiving a reflected wave of the transmission signal reflected from the object.

BACKGROUND ART

In order to find out an external environment of a mobile machine or the like, such as a robot, an automobile, a ship, an aircraft or the like, from its inside or outside, it is important to recognize surrounding objects and their shapes. In particular, when the mobile machine is allowed to automatically travel, shape recognition is more important in terms of avoidance of danger or the like. Moreover, there is a large social demand for human shape estimation, which is applicable to security services or care services. As means for estimating a shape of an object, an imaging system employing radar has attracted attention. For example, a UWB radar, which utilizes an ultra-wide band (UWB) signal, can measure a shape of a near-field target at a high resolution, and therefore, has been used in many applications for ground probing and nondestructive testing. However, in conventional ground penetrating radar imaging, most estimation algorithms for estimating a shape from a measurement result are based on iterative improvement, iterative calculation or the like, and therefore, it takes a long time to complete shape estimation. Therefore, it is difficult to directly apply the conventional techniques to a real-time process required for the aforementioned robots and the like.

Therefore, the present inventors have developed and proposed a high-speed shape estimation algorithm which enables a real-time process, called SEABED (Shape Estimation Algorithm based on BST (Boundary Scattering Transform) and Extraction of Directly scattered waves). In SEABED, a shape of an object is estimated by utilizing a reversible conversion relationship established between a relationship between a time delay of a scattered wave of a transmission signal which is obtained by changing a transmission/reception location, and the transmission/reception location, and the shape of the object (e.g., Patent Document 1 and Non-Patent Documents 1 to 5).

The principle of the SEABED method will be described below. FIG. 15 is a diagram for describing how antenna scanning is performed in the SEABED method. In the SEABED method, it is assumed that an object to be measured (target object) is a physical object which has a clear boundary, and the boundary is measured to obtain a "quasi-wavefront." A shape of the target object is obtained by inverse-transforming the quasi-wavefront.

In the description of the principle, referring to FIG. 15, a two-dimensional problem is dealt with, assuming that a target object O and a transmission/receiving antenna A are provided in the same plane. It is also assumed that radio waves propagate as Transverse Electric (TE) waves. Space in which the target object O and the transmission/receiving antenna A are located is referred to as "r-space (r-domain)," and if a set is expressed in r-domain, the set is referred to as an "expression in r-domain." Also, a point in r-domain is expressed as (x, y). Here, both x and y (y>0) are normalized using the center wavelength $\lambda$ of a transmitted pulse in vacuum. The transmission/receiving antenna A is assumed to be omnidirectional, and repeatedly transmit and receive monocycle pulses at measurement locations $x_n$ (n=1 to N (integers)) spaced at predetermined intervals (e.g., regular intervals) while scanning on the x-axis in r-domain. In addition, a reception electric field at a measurement location (x, y)=(X, 0) of the transmission/receiving antenna A is defined as s'(X, Y), and Y is defined as Y=(c×t)/(2×$\lambda$), where t is a period of time from transmission to reception, and c is the speed of light in vacuum. Note that y>0 and therefore Y>0, and also, a time at which an instantaneous envelope at a measurement location $x_n$ of the transmission/receiving antenna A becomes maximum is assumed to be t=-0.

Moreover, for the purpose of removal of noise, a matched filter using a transmission waveform is applied to s'(X, Y) in the Y-direction, and a received waveform obtained by the application of the matched filter is newly set as s(X, Y). This s(X, Y) is used as data for obtaining a shape of the target object O. Here, space expressed as (X, Y) is referred to as "d-space (d-domain)," and if a set is expressed in d-space, the set is referred to as an "expression in d-domain." X and Y are normalized using the center wavelength and the center frequency of a transmitted pulse, respectively.

Changes in the complex permittivity $\epsilon(x, y)$ of the target object O having a continuous boundary surface are assumed to be a set of a plurality of piecewise differentiable curves. Specifically, the complex permittivity s(x, y) of the target object O is expressed as:

$$|\nabla \varepsilon(x, y)|^2 = \sum_{q \in H} a_q \delta(y - g_q(x)) \quad \text{(Expression 1)}$$

Here, it is assumed that $g_q(x)$ is a differentiable single-valued function, and $q=\{(x, y)|y=g_q(x), x \in Jq\} \in H$, where Jq is the domain of definition of the function $g_q(x)$, $a_q$ is a positive constant depending on $q \in H$, and H is the set of all q's. Elements of H are "target boundary surfaces."

A subset P of d-space is defined as:

$$P=\{(X,Y)|\partial s(X,Y)/\partial Y=0\} \quad \text{(Expression 2)}$$

With respect to a connected closed set $p \subset P$, a domain $I_p$ is defined as:

$$I_p=[\min_{(X,Y) \in p} X, \max_{(X,Y) \in p} X] \quad \text{(Expression 3)}$$

A single-valued function $f_p(X)$ is present which has the domain of definition $I_p$ with respect to p if there is only one Y satisfying (X, Y)$\in$p with respect to an arbitrary $X \in I_p$, and satisfies $Y=f_p(X)$. A set of p's for which the function $f_p(X)$ is differentiable and $|\partial f_p(X)/\partial X| \leq 1$ is defined as G, and elements of G are referred to "quasi-wavefronts."

When Expression (1) is satisfied, direct scattered waves from a boundary hold information about a target boundary surface (expressing a surface and a shape of the target object O). This is similarly established in a known medium having a constant propagation speed, although it is hereinafter assumed for the sake of simplicity that all propagation paths of direct waves are in vacuum.

FIGS. 16(a) and 16(b) are diagrams for describing a boundary scattering transform. FIG. 16(a) shows an example of a change in complex permittivity in r-domain, and FIG. 16(b) shows a quasi-wavefront of d-domain corresponding to r-domain of FIG. 16(a).

If it is assumed that p corresponds to direct scattering from q, it can be seen form FIG. 16(a) that a point (X, Y) on p is expressed as Expression (4) using a relationship between the length of a vertical line from the transmission/receiving antenna A to a curve Lq expressed by q, and a location of the transmission/receiving antenna A. A transform expressed as Expression (4) is referred to as a boundary scattering transform.

Only a time delay of a scattered wave, i.e., Y is observed at the location of the antenna A of FIG. 16(a), and a scattering point is located somewhere on a circle whose center is A and whose radius is Y, however, an angle from which the scattered wave comes is unknown. Y corresponds to a time delay of a scattered wave with respect to each antenna location X. FIG. 16(b) shows a relationship between X and Y.

Note that a curve expressed by p may have a plurality of Y values with respect to some X value. Symbols ○ and Δ shown in FIG. 16(b) are an example of such a case. These symbols ○ and Δ correspond to symbols ○ and Δ shown in FIG. 16(a), respectively. The lengths of a solid line and a dashed line of FIG. 16(a) are the same as those of FIG. 16(b), respectively. The solid line and the dashed line at an antenna location P of FIG. 16(a) are both perpendicular to Lq. Points indicated by symbols ○ and Δ are scattering points of radio waves, which are received as scattered waves having different time delays in FIG. 16(b).

$$\begin{cases} X = x + y\dfrac{dy}{dx} \\ Y = y\sqrt{1 + \left(\dfrac{dy}{dx}\right)^2} \end{cases}$$ (Expression 4)

Note that (x, y) is a point located on q.

By calculating an inverse transform of this boundary scattering transform, a shape of the target object O can be obtained from a received waveform. This inverse transform is obtained as expressed as Expression (5). This inverse transform is referred to as an inverse boundary scattering transform.

$$\begin{cases} x = X - Y\dfrac{dY}{dX} \\ y = Y\sqrt{1 - \left(\dfrac{dY}{dX}\right)^2} \end{cases}$$ (Expression 5)

Although two-dimensional measurement has been described above, the SEABED method can be easily extended to three-dimensional measurement. Also, although it has been assumed above that the transmission/receiving antenna A travels along a straight line, a transform expression corresponding to a case where the transmission/receiving antenna A travels along any curves can be easily obtained.

For example, a boundary scattering transform for a three-dimensional problem is expressed as Expression (6), and its inverse transform is expressed as Expression (7).

$$\begin{cases} X = x + z\dfrac{\partial z}{\partial x} \\ Y = y + z\dfrac{\partial z}{\partial y} \\ Z = z\sqrt{1 + \left(\dfrac{\partial z}{\partial x}\right)^2 + \left(\dfrac{\partial z}{\partial y}\right)^2} \end{cases}$$ (Expression 6)

$$\begin{cases} x = X - Z\dfrac{\partial Z}{\partial X} \\ y = Y - Z\dfrac{\partial Z}{\partial Y} \\ z = Z\sqrt{1 - \left(\dfrac{\partial Z}{\partial X}\right)^2 - \left(\dfrac{\partial Z}{\partial Y}\right)^2} \end{cases}$$ (Expression 7)

In the SEABED method which estimates a shape of the target object O from a received waveform using Expression (5) (Expression (7) for a three-dimensional problem), the shape of the target object O is specifically measured by executing the following process.

FIG. 17 is a flowchart showing a procedure when a shape of an object is measured by the SEABED method.

As shown in FIG. 17, in the conventional SEABED method, at each measurement location $x_n$, a shape measurement instrument (not shown) transmits a monocycle pulse (transmitted pulse), receives a reflected wave of the transmitted pulse reflected from the target object O, performs analog-to-digital conversion (hereinafter abbreviated as "A/D conversion") with respect to the received wave, and stores the resultant wave, while scanning the omnidirectional transmission/receiving antenna A as shown in FIG. 15 (step S101).

Specifically, at a the measurement start location $x_1$, the shape measurement instrument initially transmits a monocycle pulse (transmitted pulse) from the omnidirectional transmission/receiving antenna A, receives a reflected wave of the transmitted pulse reflected from the target object O, performs A/D conversion with respect to the received wave to generate a first received signal, and stores the first received signal. After completing transmission and reception at the measurement start location $x_1$, at a measurement location $x_2$ which is at a predetermined interval away from the measurement start location $x_1$ the shape measurement instrument transmits a monocycle pulse (transmitted pulse) from the transmission/receiving antenna A, receives a reflected wave of the transmitted pulse reflected from the target object O, performs A/D conversion with respect to the received wave to generate a second received signal, and stores the second received signal. Thereafter, similarly, at each measurement location $x_n$ (from the measurement start location $x_1$ to a measurement end location $x_N$), the shape measurement instrument transmits a monocycle pulse (transmitted pulse) from the transmission/receiving antenna A, receives a reflected wave of the transmitted pulse reflected from the target object O, performs A/D conversion with respect to the received wave, and stores the resultant received signal. Thus, the first received signal at the measurement start location $x_1$ to an N-th received signal at the measurement end location $x_N$ are obtained.

Next, in step S102, the shape measurement instrument obtains a cross-correlation between a waveform of each of the first to N-th received signals and a waveform of a reference signal, thereby obtaining first to N-th correlation waveforms corresponding to the first to N-th received signals, respectively. A correlation function $\rho(\tau)$ is expressed as:

$$\rho(\tau) = \int s(t) \cdot r(t+\tau) dt$$ (Expression 8)

where τ is the time delay, r(t) is the reference signal, and s(t) is the received signal. Note that the integration range is a range within which the received signal s(t) exists.

Here, the waveform of the reference signal is the waveform of the transmitted pulse, which is based on the assumption that the waveform of the received signal has the same shape as that of the transmitted pulse. A process in this step corresponds to application of a matched filter to the received signal.

Next, in step S103, the shape measurement instrument obtains extremums (relative maximums and relative minimums) in the first to N-th correlation waveforms.

Next, in step S104, the shape measurement instrument connects adjacent extremums. More specifically, the shape measurement instrument connects extremums in a manner which satisfies Expression (9):

$$-1 \leq (\text{location of extremum } M_n - \text{location of extremum } M_{n-1})/(\text{measurement location } X_n - \text{measurement location } X_{n-1}) \leq 1 \quad \text{(Expression 9)}$$

Here, the location of extremum $M_n$ is a location in an XY plane of an extremum obtained from an n-th correlation waveform obtained at the measurement location $x_n$. A curve obtained by connecting the extremums in this manner is a quasi-wavefront.

Next, in step S105, the shape measurement instrument extracts a true quasi-wavefront. The quasi-wavefront obtained by the process of step S104 includes undesired quasi-wavefronts, such as one which is generated due to noise, one which is generating by extracting a vibration component, one which is generated due to multiple scattering, and the like. Therefore, it is necessary to remove these undesired quasi-wavefronts so as to extract a true quasi-wavefront which truly indicates a boundary surface of the object O. In this process of extracting a true quasi-wavefront, an evaluation value $w_p$ which is defined as Expression (10) is firstly used to select and extract a quasi-wavefront having an evaluation value $w_p$ which is larger than a predetermined threshold α. If the threshold α is excessively small, a large number of undesired quasi-wavefronts are included. If the threshold a is excessively large, true quasi-wavefronts are also removed. Therefore, the threshold α is experimentally or empirically set in view of the maximum value of the evaluation value $w_p$.

$$w_p = |\int_{x \in I_p} s(X, f_p(X)) dX|^2 \quad \text{(Expression 10)}$$

The evaluation value $w_p$ takes a large value when a received signal on a quasi-wavefront has a large amplitude, and the domain of definition of $f_p(X)$ is wide.

Here, if only Expression (10) is used to extract true quasi-wavefronts, then when a quasi-wavefront caused by, for example, noise is located close to a true quasi-wavefront, the evaluation value $w_p$ may be large and therefore the quasi-wavefront may not be removed. Therefore, when $(x, y) \in p_1$ and $(x, y) \in p_2$ are established where $p_1, p_2 \in G$, $p_1 \neq p_2$ and $w_{p1} \leq w_{p2}$, quasi-wavefronts are divided, i.e., $p_1 \rightarrow p_{1'}, p_{1''}$ (note that $p_{1'} \cup p_{1''} = p_1$ and $p_{1'} \cap p_{1''} = p_1 \cap p_2$) to obtain the evaluation value $w_p$, thereby removing undesired quasi-wavefronts.

Thereafter, in the true quasi-wavefront extraction process, $F_p$ (known as a first Fresnel zone) expressed as Expression (11) and a new evaluation value $W_p$ defined as Expression (12) are secondly used to select and extract a quasi-wavefront having an evaluation value $W_p$ larger than a predetermined threshold β. If the threshold β is excessively small, a large number of undesired quasi-wavefronts are included. If the threshold β is excessively large, true quasi-wavefronts are also removed. Therefore, the threshold β is experimentally or empirically set in view of the maximum value of the evaluation value $W_p$.

$$F_p = \left\{ (x_0, y_0) \,\middle|\, \sqrt{(x-x_0)^2 + (y-y_0)^2} + \sqrt{(x-X)^2 + y^2} < 1/2 \right\} \quad \text{(Expression 11)}$$

$$W_p = w_p - \sum_{q \neq p \in G} w_q \frac{\int_{(x,y) \in \mathcal{B}[q], F_p} \xi(x) dx}{\int_{x \in I_q} \xi(x) dx} \quad \text{(Expression 12)}$$

The evaluation value $W_p$ takes a smaller value when another boundary surface having a large value is located in the Fresnel zone of some quasi-wavefront. ξ(x) is a weight function. For example, for the sake of simplicity, ξ(x) is set to ξ(x)=1.

A true quasi-wavefront thus extracted is a set of time periods from transmission of transmitted pulses at respective measurement locations until reflected waves of the transmitted pulses which impinge on and are reflected from tangent planes of a surface of the target object O are directly received.

Next, in step S106, the shape measurement instrument obtains the shape of the object O from the true quasi-wavefronts extracted in step S105 using Expression (5).

Thus, in the SEABED method, the shape of the target object O can be directly estimated by the inverse transform expressed as Expression (5). Therefore, the shape of the object O can be considerably quickly measured.

In the SEABED method described above, a shape can be estimated by the inverse boundary scattering transform expressed as Expression (5) or (7). An image obtained by the inverse boundary scattering transform is not an approximate solution and is a mathematically exact solution, and can be directly obtained rather than based on iterative calculation. These advantages enable the SEABED method to be an imaging algorithm capable of calculation at higher resolution than those of conventional methods and at considerably high speed.

Patent Document 1: Japanese Laid-Open Patent Publication No. 2006-343205

Non-Patent Document 1: Takuya SAKAMOTO and Tom SATO, "A Nonparametric Target Shape Estimation Algorithm for UWB Pulse Radar Systems," TECHNICAL REPORT OF IEICE, A•P2003-36, vol. 103, no. 120, pp. 1-6, Jun. 19, 2003

Non-Patent Document 2: Takuya SAKAMOTO and Tom SATO, "A Phase Compensation Algorithm for High-Resolution Shape Estimation Algorithms with Pulse Radars," TECHNICAL REPORT OF IEICE, A•2004-72, vol. 104, no. 202, pp. 37-42, Jul. 22, 2004

Non-Patent Document 3: Takuya SAKAMOTO and Tom SATO, "A Target Shape Estimation Algorithm for Pulse Radar Systems based on Boundary Scattering Transform," IEICE TRANSACTIONS on Communications, Vol. E87-B, No. 5, May 2004, pp. 1357-1365

Non-Patent Document 4: Shouhei KIDERA, Takuya SAKAMOTO and Toru SATO, "A Fast Imaging Algorithm with Bi-static Antenna for UWB Pulse Radar Systems," 34-th Electromagnetic Theory Symposium of IEICE, EMT-05-58, November 2005

Non-Patent Document 5: Shouhei Kidera, Takuya Sakamoto and Toru Sato, "A High-resolution 3-D Imaging Algorithm with Linear Array Antennas for UWB Pulse Radar Systems," IEEE AP-S International Symposium, USNC/URSI National Radio Science Meeting, AMEREM Meeting, pp. 1057-1060, July, 2006

DISCLOSURE OF THE INVENTION

Problems to be Solved by the Invention

However, in the SEABED method, it is necessary to move a transmission/receiving antenna when a signal is transmitted and received. In addition, it is necessary to move the transmission/receiving antenna at low speed so as to obtain a sufficiently high signal-to-noise power ratio for analysis. Therefore, the measurement requires a long time, and therefore, the advantage of high-speed processing of the SEABED method is not exhibited, resulting in a disadvantage that it takes a long time to perform the overall process from the measurement to the shape estimation.

An object of the present invention is to provide a shape measurement system capable of measuring a target object quickly.

Solution to the Problems

A shape measurement instrument of the present invention includes a plurality of transmitters configured to generate signals expressed as a function system having a low cross-correlation value which is similar to an orthogonal function system or a quasi-orthogonal function system, and radiate the signals having different waveforms or phases, a receiver configured to receive the signal reflected from a target object, a correlation unit configured to obtain a correlation waveform of a waveform of the signal received by the receiver and the signal radiated by the transmitter radiating the received signal of the plurality of transmitters, and a shape estimation unit configured to extract a quasi-wavefront based on a plurality of the correlation waveforms obtained by the correlation unit, and estimate a shape of the target object based on a relationship between the quasi-wavefront and the shape of the target object.

With this configuration, the transmitters can simultaneously radiate signals, and the receiver can demodulate the signals. Therefore, the transmitters do not need to be scanned and a shape of a target object can be estimated by performing measurement once. Therefore, a period of time required for measurement can be significantly reduced.

In particular, the transmitters and the receiver may be provided at substantially the same location. In this case, a so-called SEABED method can be used to increase the speed of an estimation algorithm and therefore increase the overall speed of measurement and calculation (real-time imaging).

Moreover, a signal having a fractional bandwidth (a ratio of an occupied bandwidth to a center frequency) of 20% or more or a UWB signal may be used as the transmission signal. In this case, a shape of an object can be measured with higher accuracy. Also, a carrier wave (sine wave) modulated using a digital signal having a binary value including a positive value and a negative value may be used instead of a baseband signal.

Moreover, a pseudonoise sequence code (PN code) may be used as the transmission signal. In this case, a broad-band and high-resolution signal can be obtained. For example, if an M-sequence having a high autocorrelation is used as the pseudonoise sequence, a shape measurement instrument having a broad dynamic range can be achieved.

Also, an M-sequence may be used as the pseudonoise sequence and M-sequence codes having different phases may be assigned as signals of the transmitters. In this case, a large number of transmitters can be simultaneously used.

Also, a Gold sequence may be used as the pseudonoise sequence. In this case, a large number of transmitters can be simultaneously used without synchronization. Also, the degree of freedom of selection of a combination of optimum codes for an imaging system is increased.

Also, a Kasami sequence may be used as the pseudonoise sequence. In this case, a larger number of transmitters can be simultaneously used than when a Gold sequence is used. The resolution of an obtained image can be increased by increasing the number of transmitters.

Also, when the transmitters and the receiver are provided at different locations, a revised SEABED method which is obtained by revising the SEABED method may be used. In this case, the speed of the estimation algorithm can be increased, and the overall speed of measurement and calculation can be increased (real-time imaging).

As a result, when an expensive receiver, such as a weather radar, a radar for astronomical observatory or the like, is used, the number of receivers can be reduced, resulting in lower cost.

Alternatively, signals of a plurality of transmitters may be received by a plurality of receivers. In this case, the amount of information can be increased while the system includes a smaller number of transmitters and receivers, whereby high-accuracy measurement can be performed with relatively low cost.

A shape measurement method of the present invention employs a shape measurement instrument including a plurality of transmitters, a receiver configured to receive a signal reflected from a target object, a correlation unit, and a shape estimation unit. The method includes the steps of (a) radiating signals having different waveforms or phases expressed as an orthogonal function system or a quasi-orthogonal function system by the plurality of transmitters, (b) receiving the signals reflected from the target object by the receiver, (c) obtaining a correlation waveform of a waveform of the signal received by the receiver and the signal radiated by the transmitter radiating the received signal of the plurality of transmitters, by the correlation unit, (d) obtaining the time delays which give an extremum of the correlation waveform by the shape estimation unit, (e) connecting adjacent ones of the delays which give an extremum to generate a quasi-wavefront by the shape estimation unit, (f) extracting a true quasi-wavefront from the quasi-wavefront by the shape estimation unit, and (g) estimating a shape of the target object from the true quasi-wavefront by the shape estimation unit.

According to this method, the transmitters output signals having different phases or waveforms, whereby the transmitters can simultaneously output the signals. Therefore, a shape of an object can be estimated by performing measurement once, resulting in a reduction in a period of time required for measurement.

Shape estimation may be performed using the SEABED method or the revised SEABED method, depending on the locations of a receiver and a transmitter. In this case, a calculation time required for shape estimation can be significantly reduced.

Effect of the Invention

Thus, the shape measurement instrument of the present invention can acquire data by performing measurement once, whereby real-time imaging can be achieved.

DESCRIPTION OF THE REFERENCE CHARACTERS

Figure 1:
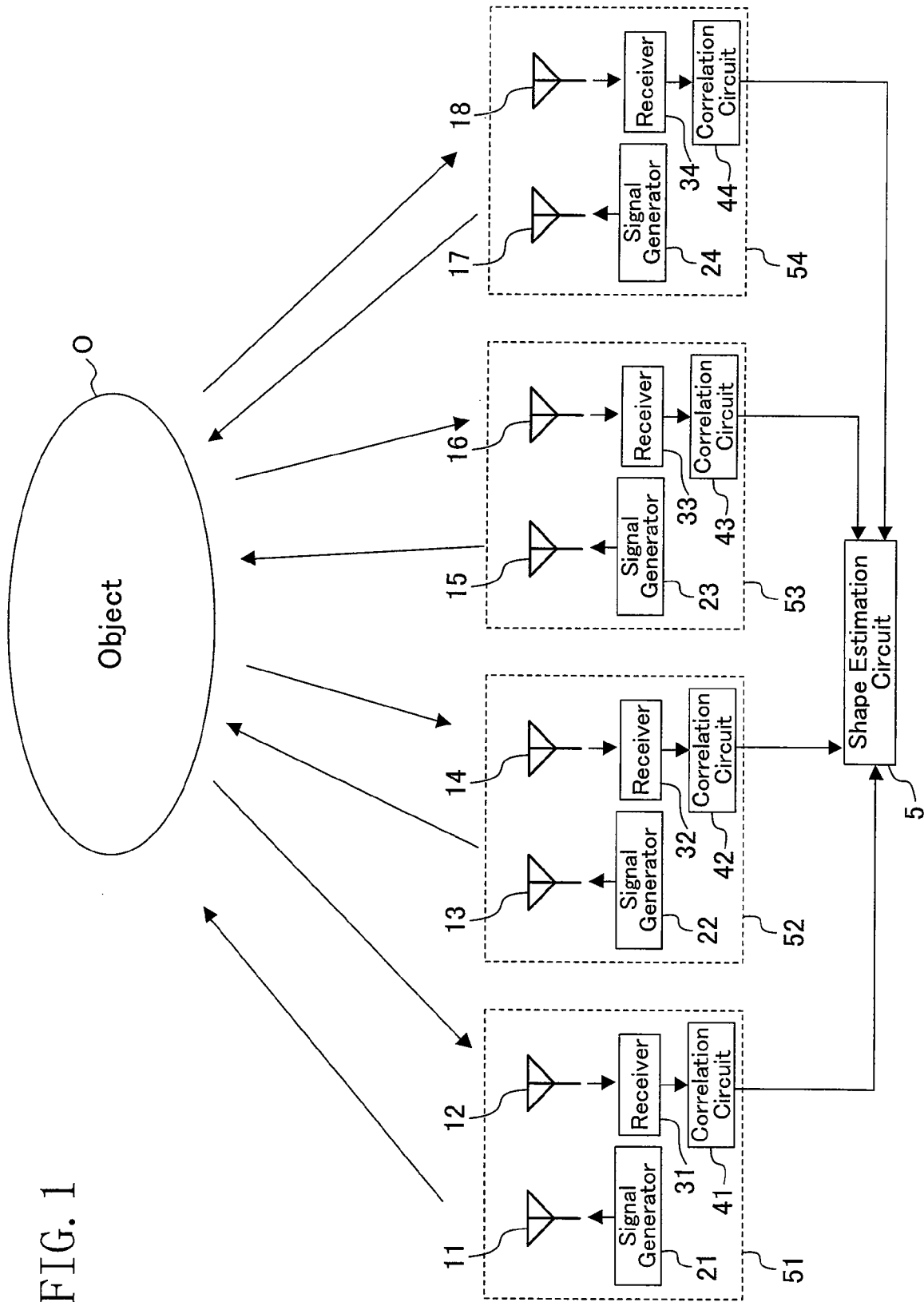
FIG. 1 is a diagram showing an example circuit configuration in a shape measurement instrument using electromagnetic waves according to a first embodiment of the present invention.

O, 20 object
2, 4, 6 transmitting antenna
5 shape estimation circuit
7, 12, 14, 16, 18, 19 receiving antenna
8 receiving circuit
9 shape estimation circuit
11, 13, 15, 17 transmitting antenna
21, 22, 23, 24 signal generator
31, 32, 33, 34 receiver
41, 42, 43, 44 correlating circuit
51, 52, 53, 54 radar

BEST MODE FOR CARRYING OUT THE INVENTION (First Embodiment)

Hereinafter, a first embodiment of the present invention will be described with reference to the accompanying drawings.

FIG. 1 is a diagram showing an example circuit configuration in a shape measurement instrument using electromagnetic waves according to the first embodiment of the present invention.

The shape measurement instrument of this embodiment includes a plurality of radars and a shape estimation circuit as shown in FIG. 1. Specifically, the shape measurement instrument of this embodiment includes radars 51, 52, 53 and 54 provided at different locations and a shape estimation circuit 5 which receives signals output from the radars 51 to 54. Each of the radars 51 to 54 has a signal generator which generates an electrical signal, a transmitting antenna which radiates the electrical signal generated by the signal generator as a transmitted radio wave into space, a receiving antenna which receives a reflected wave of the transmitted radio wave reflected from a target object O, a receiver which receives a received wave, and a correlating circuit which receives an output of the receiver. Specifically, the radar 51 has a signal generator 21, a transmitting antenna 11, a receiving antenna 12, a receiver 31, and a correlating circuit 41. The radar 52 has a signal generator 22, a transmitting antenna 13, a receiving antenna 14, a receiver 32, and a correlating circuit 42. The radar 53 has a signal generator 23, a transmitting antenna 15, a receiving antenna 16, a receiver 33, and a correlating circuit 43. The radar 54 has a signal generator 24, a transmitting antenna 17, a receiving antenna 18, a receiver 34, and a correlating circuit 44. Note that the number of radars is not limited to four and may be more than four. Although an example in which the radars 51 to 54 are arranged on a line in a plane as shown in FIG. 1 for the sake of simplicity will be described, radars may be arranged in a two-dimensional array so as to two-dimensionally measure a shape of the object O. Although the transmitting antenna and the receiving antenna are preferably separately provided when a code is used, a single antenna may be used for both transmission and reception. Note that the transmitted radio wave preferably has a fractional bandwidth (a ratio of an occupied bandwidth to a center frequency) of 20% or more.

Next, measurement operation of, for example, the radar 51 will be described. Initially, the signal generator 21 generates, for example, a 26 GHz-band sine wave (carrier wave), and modulates the carrier wave using a pseudonoise (PN) code (spread spectrum). As a modulation method, phase modulation is performed, for example. For example, the carrier wave and the pseudonoise code are input and multiplied in a double balanced mixer circuit including Gilbert cells, whereby a phase-modulated transmission signal can be easily generated. A signal which is radiated as a transmitted wave from the transmitting antenna 11 is reflected on the object O, and a part of the signal is received by the receiving antenna 12. Thereafter, a received wave output from the receiving antenna 12 may be subjected to amplification, shaping (filtering) or the like in the receiver 31 before being transferred as a received signal to the correlating circuit 41. The correlating circuit 41 obtains a correlation between the received signal and the reference signal to obtain a correlation waveform. Specifically, the received signal is demodulated using the same PN code as that for the transmission signal (so-called despreading), and is down-converted using the carrier wave, thereby obtaining the correlation waveform.

The radars 52 to 54 also simultaneously perform operation similar to that of the radar 51, and transfer respective correlation waveforms to the shape estimation circuit 5. Places where the radars 51 to 54 are placed are directly used as measurement locations, whereby correlation waveforms at the first to fourth measurement locations are obtained. Next, as in the aforementioned SEABED method, the shape estimation circuit 5 obtains a location where a relative maximum of the absolute values of the correlation waveforms is obtained, extracts a quasi-wavefront, and outputs a shape of the object using the inverse boundary scattering transform.

Specifically, extremums in the correlation waveforms output from the radars 51 to 54 are obtained, and thereafter, adjacent extremums are connected in a manner which satisfies Expression (9). Next, the evaluation value $w_p$ defined as Expression (10) is used to select and extract a quasi-wavefront having an evaluation value larger than a predetermined threshold $\alpha$. Here, when $(x, y) \epsilon p_1$ and $(x, y) \epsilon p_2$ are established where $p_1$, $p_2 \epsilon G$, $p_1 \neq p_2$ and $w_{p1} \leq w_{p2}$, quasi-wavefronts are divided, i.e., $p_1 \to p_{1'}$, $p_{1''}$ (note that $p_{1'} \cup p_{1''} = p_1$ and $p_{1'} \cap p_{1''} = p_1 \cap p_2$) to obtain the evaluation value $w_p$, thereby removing undesired quasi-wavefronts. Moreover, $F_p$ expressed as Expression (11) and the new evaluation value $W_p$ defined as Expression (12) are used to select and extract a quasi-wavefront having an evaluation value $W_p$ larger than a predetermined threshold $\beta$. As a result, a true quasi-wavefront is obtained. Next, the shape estimation circuit 5 obtains a shape of the object O from the true quasi-wavefront using Expression (5).

Note that, in the shape measurement instrument of this embodiment, if the transmitting antennas are assigned different PN codes, then even when a plurality of radars (transmitters) simultaneously transmit electrical signals, and a receiving antenna simultaneously receives an electrical signal transmitted from its own radar and an electrical signal transmitted from a different radar, the radar can extract its own signal by performing despreading using its own transmission code. In other words, according to the shape measurement instrument of this embodiment and its measurement method, data of all the measurement locations can be simultaneously obtained without changing the operations of the radars, whereby a measuring time period for imaging can be reduced to about ¼ of that which is required when the radars are changed. Although four radars are used in this embodiment, higher-accuracy imaging can be achieved by increasing the number of radars. Also in this case, the radars can simultaneously perform measurement, and therefore, the increase in measuring time period can be suppressed irrespective of the increase in accuracy.

For example, if M-sequence codes, which have excellent autocorrelation, are used as the PN codes, the measurement dynamic range of each radar can be broadened, resulting in higher-accuracy imaging. Also, the number of M-sequence codes having a low cross-correlation value is limited, and therefore, when the number of radars is large, the outputs of the radars may be synchronized and the same M-sequence codes having different phases may be assigned to the radars. As a result, even when a larger number of radars are used, simultaneous measurement can be achieved. In addition, as the same M-sequence is used, suppression of cross-correlation between different radars can be achieved in addition to the excellent autocorrelation characteristic of the M-sequence.

Moreover, when Gold codes, each of which is a combination of M-sequence codes, are used as the PN codes, the number of codes can be dramatically increased without establishing the aforementioned synchronization. As a result, codes can be selected with a high degree of freedom, depending on the purpose of the system, as described below. Alternatively, by using Kasami sequences as the PN codes, a larger number of transmitters (transmitting antennas) can be simultaneously used than that when Gold sequences are used. The increase in the number of transmitters can increase the resolution of an obtained image.

Although a case where radars output PN codes has been described above, the radars may output a quasi-orthogonal function system which is similar to an orthogonal function system and in which the minimum angle between functions is, for example, 80, 70, 60, 50 degrees or the like, in addition to the orthogonal function system in which the angle between any two of all functions is 90 degrees. Here, the quasi-orthogonal function system refers to a function system in which the minimum angle between functions is 50 degrees or more (i.e., a low cross-correlation value), or a function system in which functions have a cross-correlation value which is low but does not cause the functions to hinder operation of each other. Signals expressed by the quasi-orthogonal function system include those which are modulated using an M-sequence code, a Gold sequence code or the like. By using these signals in the shape measurement instrument, the effect of reducing the measuring time period can be obtained.

Note that the shape measurement instrument of this embodiment can be employed in automobiles, robots, and other various machines. When two-dimensionally arranged radars are used in an automobile, the locations of the radars are changed with time due to movement of the automobile, whereby a three-dimensional shape of the object O can be measured. Therefore, a target object can be determined to some extent, which can contribute to an improvement in safety during driving the automobile.

(Second Embodiment)

Figure 2:
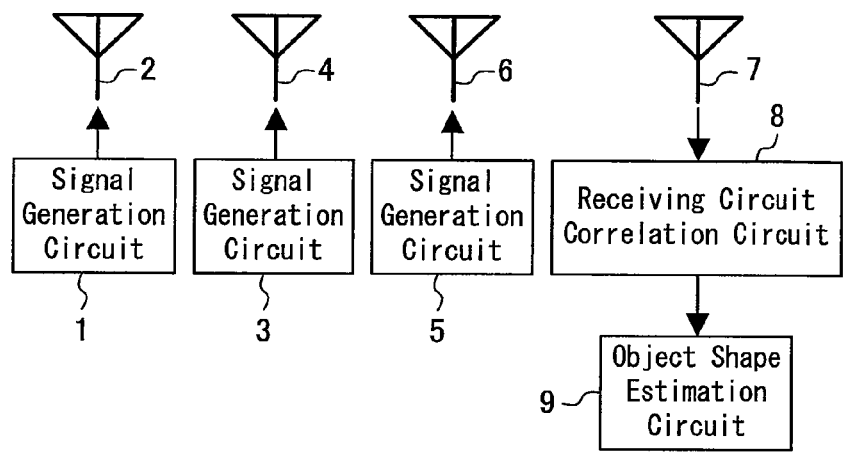
FIG. 2 is a diagram showing a circuit configuration in a shape measurement instrument according to a second embodiment of the present invention.

FIG. 2 is a diagram showing a circuit configuration in a shape measurement instrument according to a second embodiment of the present invention. As shown in FIG. 2, the shape measurement instrument of this embodiment includes a plurality of transmitting circuits each having a transmitting antenna, a single receiving circuit and correlating circuit, and an object shape estimation circuit. The transmitting circuits have respective transmitting antennas 2, 4 and 6, and each have a signal generation circuit. Also, the functions and operation of the receiving antenna 7 and the receiving circuit 8 are similar to those of the receiving antenna and the receiver of the first embodiment of FIG. 1, and the function and operation of the correlating circuit are also similar to those of the correlating circuit of the first embodiment.

The shape estimation circuit 9 has a function and operation basically similar to those of the shape estimation circuit 5 of FIG. 1. The receiving circuit 8 and the correlating circuit demodulate reflected waves of transmitted waves which have been modulated using different codes, using codes which are assigned to the respective transmitting circuits, to obtain correlations with the respective transmitted waves. The selection of codes and the method for modulation are similar to those of the shape measurement instrument of the first embodiment.

In the second embodiment, a single receiving antenna, receiving circuit and correlating circuit are provided for a plurality of transmitting antennas and transmitting circuits, whereby the entire system can be simplified and its cost can be reduced. In particular, when radars are used to measure an object which is located at a great distance, a receiving circuit is more expensive than a transmitting circuit, and therefore, the configuration of this embodiment allows a significant reduction in cost.

Note that the inverse transform expression (Expression (5)) in the SEABED method described in the BACKGROUND ART section is established under the assumption of a monostatic radar in which the receiving antenna and the transmitting antenna are provided at the same location, and therefore, cannot be directly used when the transmitting antenna and the receiving antenna are provided at different locations as in this embodiment. However, by extending the SEABED method to a bi-static model as described below, a solution can be directly obtained using an inverse transform expression as in the first embodiment or the like. Hereinafter, the SEABED method thus revised (hereinafter referred to as a "revised SEABED method") will be described.

FIGS. 3(a) and 3(b) are diagrams for describing a difference in arrangement of receiving and transmitting antennas between a conventional SEABED method and a revised SEABED method used in this embodiment. In the antenna arrangement of the conventional SEABED method of FIG. 3(a), a transmitting antenna which transmits a signal and a receiving antenna which receives the signal are provided at substantially the same locations no matter whether an antenna is scanned or antennas are provided in an array. However, in the revised SEABED method, a receiving antenna is fixed to a single location even if the location of a transmitting antenna is changed. In such a case, a revised boundary scattering transform is provided which is expressed as:

$$X = \frac{(x^2 - y^2)\dot{y} - xy(1 - \dot{y}^2)}{2x\dot{y} - y(1 - \dot{y}^2)} \quad \text{(Expression 13)}$$

$$Y = \frac{1}{2}\left\{\sqrt{x^2 + y^2} + \sqrt{y^2 + \frac{(x^2 + y^2)^2 \dot{y}^2}{(y - 2x\dot{y} - y\dot{y}^2)^2}}\right\}$$

where 2Y is a distance corresponding to a time delay with respect to a transmitting antenna location (2X, 0) and a receiving antenna location (0, 0).

Here, a character y with a dot thereon is a derivative dy/dx. In this specification, the character y with a dot thereon is also denoted as y'.

An ellipse whose major axis has a length of 2Y (2Y is the time delay multiplied by the speed of light) and whose focuses are a receiving antenna location (0, 0) and a transmitting antenna location (2X, 0) is expressed as F(x, y, X)=0. Note that F(x, y, X) is expressed as:

$$F(x, y, X) = \frac{(x - X)^2}{Y^2} + \frac{y^2}{Y^2 - X^2} - 1 \quad \text{(Expression 14)}$$

Here, Y is a function of X and therefore is not explicitly indicated as an independent variable of F. An envelope which is drawn by the ellipse when the parameter X corresponding to the location of a middle point between the transmitting and receiving antennas is changed, satisfies the following two expressions (Expression (15)).

$$F(x,y,X)=0$$

$$\partial F(x,y,X)/\partial X = 0 \quad \text{(Expression 15)}$$

Note that the partial derivative by X in Expression (15) means that it is independent of x and y, not of Y. By solving the simultaneous equations for x and y, an inverse revised boundary scattering transform is expressed as:

$$x = \frac{(X^2 + Y^2)\dot{Y} - 2XY}{X\dot{Y} - Y} \quad \text{(Expression 16)}$$

$$y = \left|\frac{Y^2 - X^2}{Y - X\dot{Y}}\right|\sqrt{1 - \dot{Y}^2}$$

Here, a character Y with a dot thereon is a derivative dY/dX. In this specification, the character Y with a dot thereon is also denoted as Y'.

The use of Expression (16) allows high-speed estimation of a shape of a target object in the shape measurement instrument of this embodiment as well, which makes it possible to perform real-time imaging.

In the description above, expressions for transform are shown for the SEABED method in which transmission and reception are performed in the same location and transmission/reception locations are changed, and in the revised SEABED method in which only transmission locations are changed while a reception location is fixed or in which only reception locations are changed while a transmission location is fixed. In contrast to this, when transmission and reception locations are scanned while these locations are spaced apart at a predetermined distance, a two-dimensional transform expression for imaging derived in Non-Patent Document 4 can be applied to the shape measurement instrument of the present invention. Specifically, the conventional SEABED method is applied to a case where the transmitting antenna 11 and the receiving antenna 12 of FIG. 1 are sufficiently close to each other so that a distance between the antennas can be neglected. When the distance between the antennas needs to be taken into consideration, it is necessary to use an expression in which the predetermined distance between transmission and reception locations is taken into consideration. Moreover, in the case of a three-dimensional arrangement, a transform expression described in Non-Patent Document 5 can be used.

Moreover, also when transmission locations and reception locations are scanned along respective separate curves, an envelope of ellipses corresponding to a plurality of transmission and reception locations can be derived under a condition that a partial derivative by a variable which varies during scanning is zero, where the focuses of each ellipse are a transmission point and a reception point. An expression expressing this envelope is a transform expression for generalized imaging corresponding to each case, and therefore, a generalized SEABED method which supports scanning of transmission and reception locations along an arbitrary curve is contemplated. Also for the generalized SEABED method, the present invention capable of significantly reducing a period of time required for scanning by assigning a plurality of codes to a plurality of transmission locations is effective. The effectiveness of the present invention is not limited to the techniques in which the specific transform expressions described herein are used.

(Third Embodiment)

Figure 3:
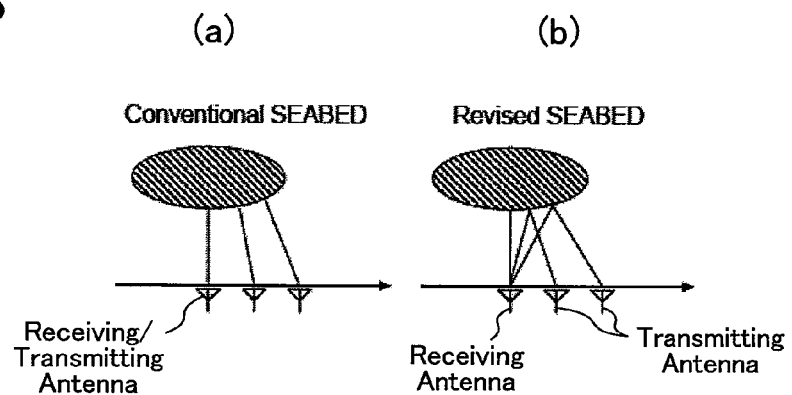
FIGS. 3(a) and 3(b) are diagrams for describing a difference in arrangement of receiving and transmitting antennas between a conventional SEABED method and a revised SEABED method used in this embodiment.

A more specific example of the present invention including a code will be described using a model shown in FIG. 3.

Figure 4:
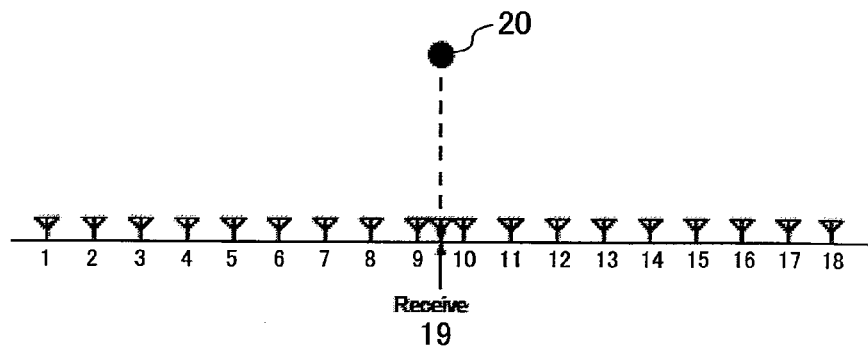
FIG. 4 is a diagram showing a model of a part of a shape measurement instrument according to a third embodiment of the present invention.

FIG. 4 is a diagram showing a model of a part of a shape measurement instrument according to a third embodiment of the present invention. The shape measurement instrument of this embodiment has a configuration including a plurality of transmitting circuits and a single fixed receiving circuit as in the shape measurement instrument of the second embodiment. In FIG. 4, for the sake of simplicity, the transmitting circuits and the receiving circuit are each represented only by an antenna. FIG. 4 shows an example in which first to eighteenth transmitting antennas and a single receiving antenna 19 for measuring an object 20 are provided. The shape measurement instrument of this embodiment has basically the same configuration as that of the object estimation apparatus of the second embodiment. The shape measurement instrument also includes an A/D converter and a memory.

In this system, the single receiving antenna receives signals from the eighteen transmitting antennas. Also, the transmitting antennas and the receiving antenna are assumed to be omnidirectional antennas. Also, the transmitting antennas transmit UWB signals which are spread using pseudonoise sequences, in a baseband without using a carrier wave. Signals obtained by the receiving antenna are subjected to A/D conversion before being stored into the memory.

In the description which follows, for the sake of simplicity, a two-dimensional problem is dealt with and the mode of electromagnetic waves is assumed to be the TE mode. It is assumed that a target (object to be measured) and the antennas are located in a plane, and the target has a clear boundary. Space in which the target and the antennas are located is referred to as real space. A point in the real space is expressed as (x, y). Here, both x (>0) and y (>0) are normalized by a center wavelength $\lambda$, of a transmitted pulse in vacuum. A location of the receiving antenna is assumed to be an origin (x, y)=(0, 0), and the transmitting antennas are assumed to be located on an x-axis in the real space. An output of a matched filter applied to a received signal at a location (x, y)(2X, 0) of a transmitting antenna is defined as s(X, Y). Note that Y is defined as $Y=ct/(2\lambda)$ where t is a period of time which has elapsed since transmission and c is the speed of light in vacuum. Since y>0, Y>0 is established. Space expressed as (X, Y) is referred to as data space, and an equiphase curve in the data space is referred to as a quasi-wavefront. Here, X and Y are normalized by a center wavelength and a center frequency of a transmitted pulse, respectively. As described in the second embodiment, a target shape is estimated from an obtained quasi-wavefront using Expression (16).

Figure 5:
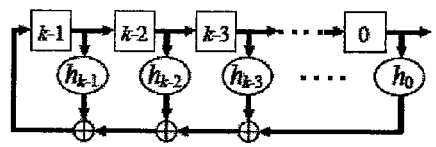
FIG. 5 is a diagram showing a k-stage linear feedback shift register which generates PN codes.

Here, a pseudonoise sequence used as a transmitting waveform will be described in detail. FIG. 5 is a diagram showing a k-stage Linear Feedback Shift Register (LFSR) which generates PN codes. Among the binary PN codes generated by the circuit of FIG. 5, those whose coefficient polynominal is a primitive polynominal in a Galois field GF(2) are referred to as M-sequences, and have a maximum period of $2^k-1$. A pair of M-sequences whose maximum cross-correlation value satisfies the lower limit of Welch of the following expression (17) which is a theoretical limit, is referred to as a preferred pair of M-sequences.

$$R_{max} \leq N \left| \frac{M-1}{NM-1} \right|^{\frac{1}{2}}$$ (Expression 17)

A Gold sequence is generated by exclusive logical OR operation of a preferred pair of M-sequences. Here, a relative shift amount between the pair of M-sequences is arbitrary, and a larger number of sequences can be obtained by periodically shifting one of the pair of sequences. It is known that a cross-correlation between Gold sequences thus obtained satisfies the lower limit of Welch. Therefore, in a radar system in which N-bit Gold sequences are simultaneously transmitted from M devices, a level of range sidelobes expressed on the right side of Expression (17) unavoidably occurs. Therefore, in this system, when S/N becomes a certain large level, the S/(I+N) ratio has a floor, and therefore, the accuracy of estimation is no longer improved. Therefore, the number of coherent integration times, the noise figure of an amplifier or the like needs to be designed, taking the lower limit of Welch into consideration.

A preferred pair of M-sequences M1 [n] and M2 [n] (n=1, 2, . . . , and 2047) used in this embodiment are generated by primitive polynominals:

$$G_1(a) = a^{11} + a^9 + 1$$ (Expression 18)

$$G_2(a) = a^{11} + a^9 + a^6 + a^3 + 1$$ (Expression 19)

Note that all the initial register values are set to 1. The i-th Gold sequence is generated as Gi[n]=M1[n]+M2[n+i] using these M-sequences. Among the Gold sequences generated by the aforementioned method, those having i=1, 2, . . . , and 18 are assigned to the transmitting antennas.

An example application of high-speed radar imaging will be described as a more specific example in detail. The system described in this embodiment is a radar system having the same configuration as that of the shape measurement instrument of FIG. 4 having eighteen transmitting antennas and a single receiving antenna. As spread codes, eighteen codes, i.e., 0th code to 17th code, of 2047 chip Gold sequences are used. An antenna interval is a distance corresponding to one chip of a spread code. For example, in the case of 2.5 Gchip/sec, the antenna interval is 12 cm. In this case, an observation range within which range aliasing does not occur is about 246 m.

Figure 6:
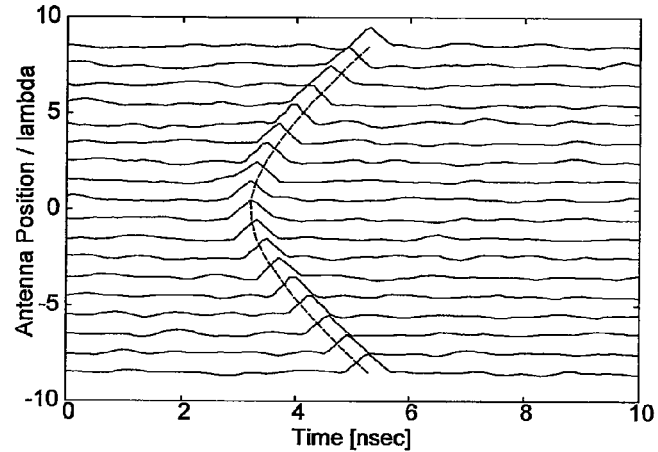
FIG. 6 is a diagram showing an output signal when a correlation process of a received signal and each Gold sequence code in the shape measurement instrument of the third embodiment.
Figure 7:
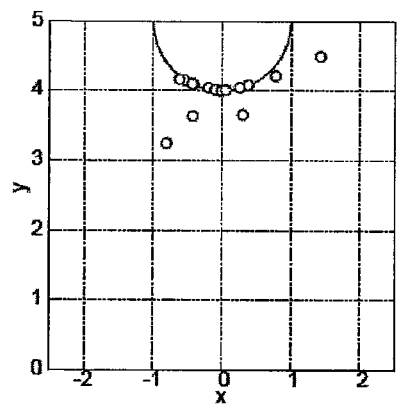
FIG. 7 is a diagram showing an estimated shape of a target object and a real shape of the target object when an influence of direct waves is not removed.

FIG. 6 is a diagram showing an output signal when a correlation process of a received signal and each Gold sequence code in the radar system (shape measurement instrument) of this embodiment. The result of the correlation process is shown by a solid line. Note that the true shape of the object is assumed to be a cylindrical shape shown by a solid line in FIG. 7. In FIG. 7, signals corresponding to the transmitting antenna locations are shown and arranged. Also, a quasi-wavefront extracted by the shape measurement instrument is shown by a dashed line in FIG. 6. Random components in the background are caused by the range sidelobes of auto- and cross-correlation functions of the Gold sequences as noise are neglected in this calculation. A shape of the object is estimated by applying the revised SEABED method to the extracted quasi-wavefront.

According to the shape measurement instrument of this embodiment, it can be seen from FIG. 7 that, whereas a degradation in accuracy of shape estimation due to an influence of range sidelobes is confirmed, a shape can be substantially correctly estimated. Also, a feature of the measurement method of this embodiment is that shape estimation can be achieved by a single snapshot, whereby a shape of an object can be quickly measured.

(Fourth Embodiment)

The shape estimation performance which is obtained when the revised SEABED method is applied to a code-division UWB radar employing Gold sequence codes, has been heretofore described using an example of numerical calculation in which only scattered waveforms are taken into consideration. However, in fact, direct waves which are transmitted from a transmitting antenna and are directly received by a receiving antenna without being scattered by a target object, have an influence on the performance of the radar. The effect of direct waves is moderate if antennas used have relatively high directionality like horn antennas. However, if small antennas, such as patch antennas or the like, are used, the influence of direct waves is large and cannot be neglected. Therefore, in a fourth embodiment, the influence of direct waves on the shape estimation performance of the proposed system is quantitatively evaluated, and an appropriate set of codes for suppressing the influence is provided. A shape estimation system model similar to that of the third embodiment is used.

Figure 8:
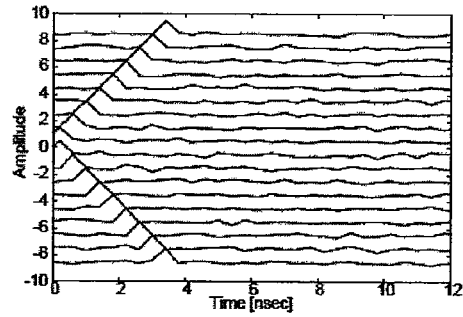
FIG. 8 is a diagram showing a received signal obtained by despreading direct waves.
Figure 9:
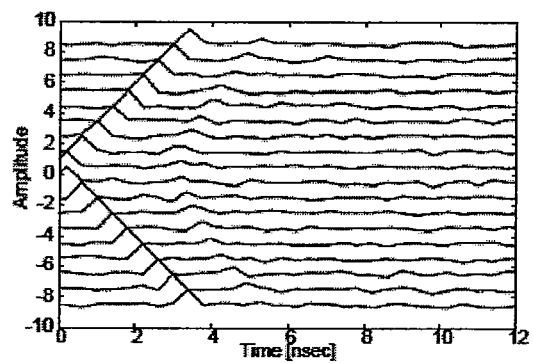
FIG. 9 is a diagram showing a received signal, where direct waves have a power which is larger than scattered waves by about 10 dB.
Figure 10:
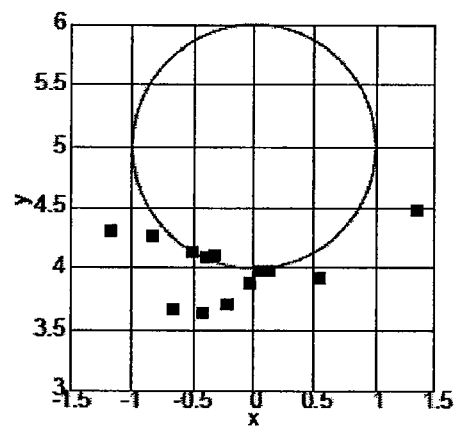
FIG. 10 is a diagram showing a shape of a target object which is estimated using the received signal of FIG. 9.

FIG. 8 is a diagram showing a received signal obtained by despreading direct waves. In FIG. 8, it can be seen that range sidelobes are substantially uniformly distributed at locations other than peaks of direct waves. Also, FIG. 9 is a diagram showing a received signal, where direct waves have a power which is larger than scattered waves by about 10 dB. In this case, a part of waveforms of scattered waves is changed as the sidelobes of the direct waves overlap the scattered waves. A target shape estimated from the received signal of FIG. 9 is shown in FIG. 10. It can be seen that a degradation in accuracy of an estimated image is larger than that of FIG. 7, and therefore, the influence of the sidelobes of the direct waves at an assumed level on the shape estimation performance cannot be neglected.

Therefore, the present inventors sought an appropriate set of codes so as to suppress the influence of the sidelobes of the direct waves. The receiving timing of each received direct wave is fixed because the distance between transmission and receiving antennas is fixed. Making use of this characteristic, the present inventors contemplated to select 18 codes whose direct waves' range sidelobes cancel each other. This is similar to an idea that a pair of complementary codes cancel the sidelobes of autocorrelation functions, thereby achieving a high resolution.

There are 2049 assumed Gold sequences (codes), and 18 suitable codes are selected from them. In addition, as the transmission timing of each code is arbitrary, the degree of freedom of periodic shifting of each code is utilized. On the other hand, range sidelobes only near the antennas are suppressed because it is not necessary to suppress all range sidelobes. This is because the shape estimation by the SEABED method does not work for targets which are sufficiently distant with respect to the width of the antenna array because the locations of the scattering centers are substantially not changed even if the locations of the transmitting antennas are changed. Therefore, only distance measurement is performed for distant targets, and imaging as well as distance measurement are performed for targets near the antennas. Note that, for distant targets, by averaging 18 received signals, the influence of the range sidelobes can be reduced to enhance the accuracy of the distance measurement. Here, the strategy that codes to be transmitted are selected from Gold sequences instead of searching general codes is adopted for the following reason. As long as Gold sequences are used, autocorrelation functions close to impulses and low-level asynchronous cross-correlation functions (minimum characteristics) can be guaranteed. Moreover, a period of time required for search can be reduced by limiting codes.

Thus, an evaluation function for code selection is expressed by:

$$\text{minimize}_{c_1, c_2, \ldots, c_M} \sum_{M=1}^{M} \sum_{l=1}^{L} \left\{ \sum_{n=1}^{M} r_{m,n}(l) \right\}^2 \quad \text{(Expression 20)}$$

Note that $r_{m,n}(l)$ is the cross-correlation function of codes $c_m$ and $c_n$, M is the number of codes, L is the number of chips where the sidelobes are suppressed. In the system described in this embodiment, for example, M=2049 and L=9. For example, if the chip rate is assumed to be 2.5 Gchip/s, high-accuracy imaging is performed within the range of about 1 m of the antennas, and only distance measurement is performed in areas beyond this range, i.e., an adaptive process depending on the distance is assumed. Note that, when optimization of Expression (20) is performed by full search, the evaluation function needs to be calculated $T_{cal} = {}_{2049}C_{18} \cdot 2047^{18}$ times. This full-search calculation requires about 1093 years using a computer having a single Xeon 2.8-GHz processor, which is completely unrealistic. Therefore, it is desirable to find a suboptimum solution. Here, a greedy algorithm will be discussed as a technique for optimizing the aforementioned evaluation function. The greedy method is a technique of successively and independently optimizing each variable for multivariable optimization, and is known as an approximation method for combinatorial optimization. Hereinafter, a specific procedure for applying the greedy method to this optimization will be described. Note that ran(n) hereinafter means a uniform random integer between 1 and n.

(1) Generate ran(2049) 18 times. Go to (2).

(2) If there is a duplicate pair of numbers in 18 random numbers, go to (1). Otherwise, set the 18 random numbers as initial Gold code numbers for the antennas and go to (3).

(3) Generate ran(2047) 18 times. Set the 18 random numbers as initial code shift values for the antennas and go to (4).

(4) Calculate and store an evaluation value as a minimum evaluation value and store the codes. Go to (5).

(5) Generate ran(18), ran(2049), and ran(2047). Change a Gold code number and a code shift for the ran(18)-th antenna to ran(2049) and ran(2047). Go to (6).

(6) If there is a duplicate pair of numbers in the 18 antenna code numbers, go to (5). Otherwise, calculate an evaluation value. Go to (7).

(7) If the evaluation value is smaller than the minimum evaluation value, set the evaluation value as a new minimum evaluation value and stores the codes. Otherwise, cancel the change by substituting the stored codes for the current codes. Go to (5).

Figure 11:
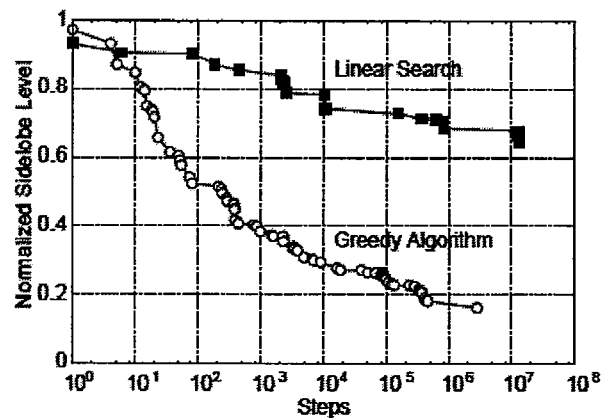
FIG. 11 shows a relationship between the number of times of call of an evaluation function and an evaluation value.

After performing the aforementioned process a predetermined number of times, finally stored codes are adopted for the radar system. A calculation time required for the code search depends approximately on the number of times of call of the evaluation function. FIG. 11 shows a relationship between the number of times of call of the evaluation function and the evaluation value. FIG. 11 shows the results of both the full search (closed squares) and the greedy method (open circles). It can be seen from FIG. 11 that the greedy method effectively solves this optimization problem and suppresses the normalized sidelobe level to about 16% compared to before the optimization. Specifically, by using this proposed codes, the S/I ratio can be improved by about 8 dB in the vicinity of the antennas without the need of additional cost.

Figure 12:
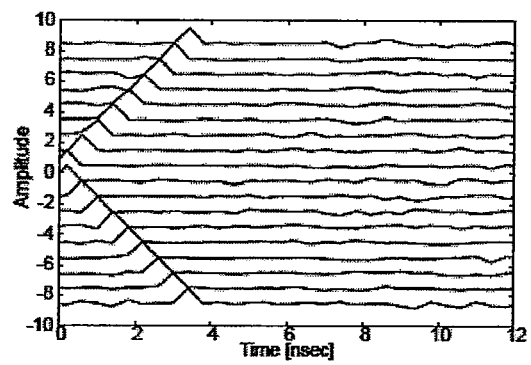
FIG. 12 is a diagram showing a signal obtained by despreading direct waves using codes used in a measurement method according to a fourth embodiment.

The proposed codes found out by the aforementioned technique were used to investigate the imaging performance of the UWB radar system (shape measurement instrument) of this embodiment. FIG. 12 is a diagram showing a signal obtained by despreading direct waves using the codes obtained by the technique of this embodiment. According to comparison of FIG. 12 and FIG. 8, it was confirmed that the sidelobe levels become lower within an area of 3.6 nsec on the right side of each peak when the technique of this embodiment is used.

Figure 13:
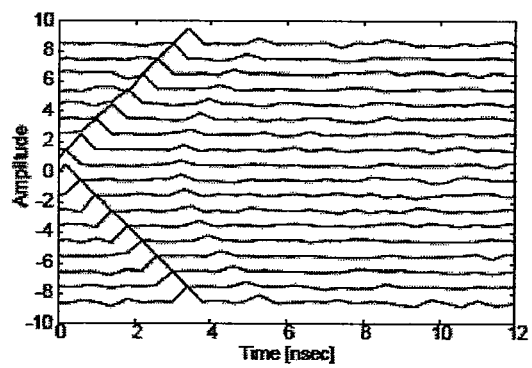
FIG. 13 is a diagram showing a received signal including scattered waves in the measurement method of the fourth embodiment.
Figure 14:
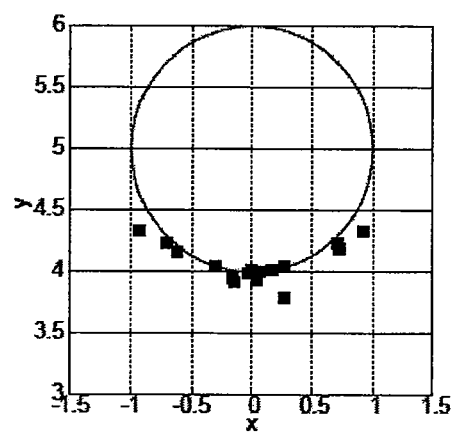
FIG. 14 is a diagram showing an estimated shape obtained by the revised SEABED method using the received signal of FIG. 13.
Figure 15:
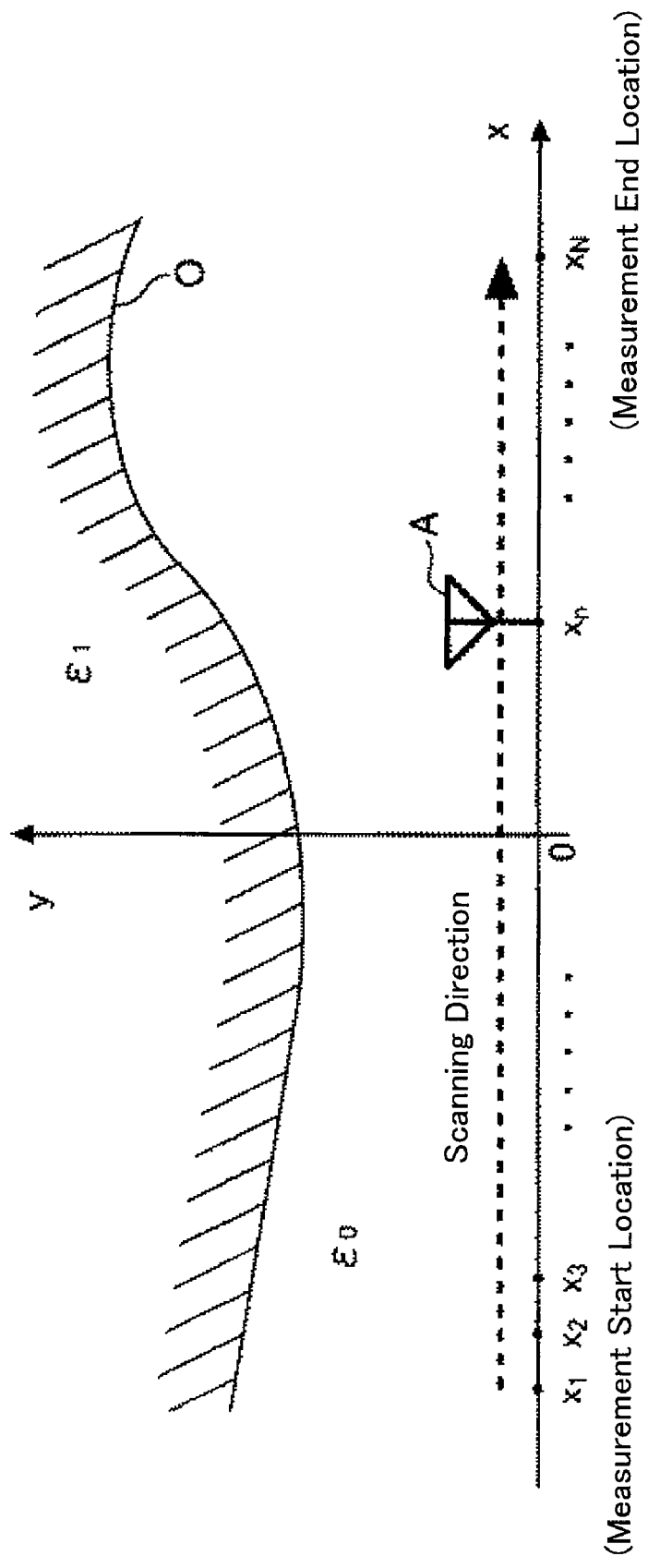
FIG. 15 is a diagram for describing how antenna scanning is performed in the SEABED method.
Figure 16:
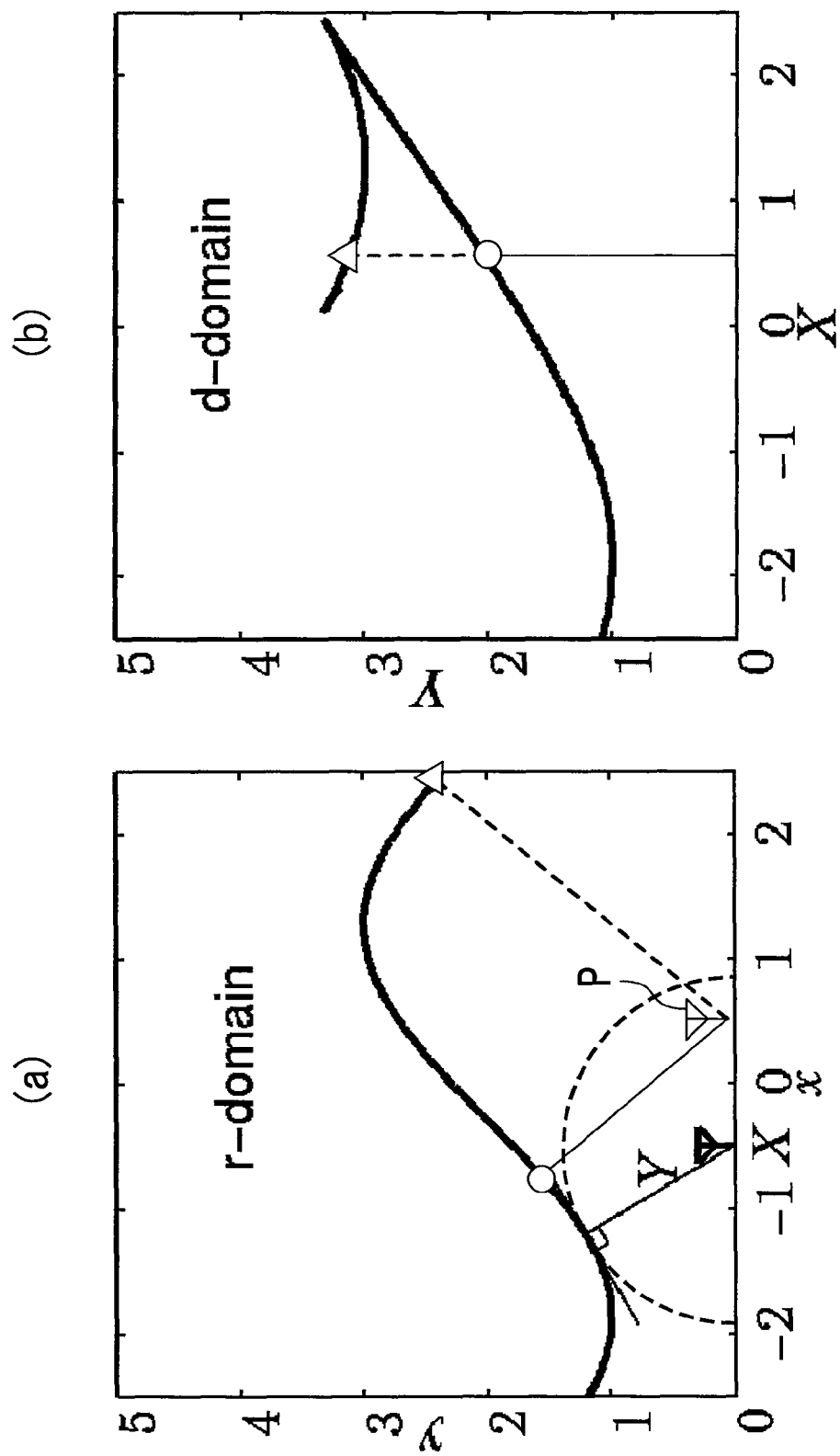
FIGS. 16(a) and 16(b) are diagrams for describing a boundary scattering transform.
Figure 17:
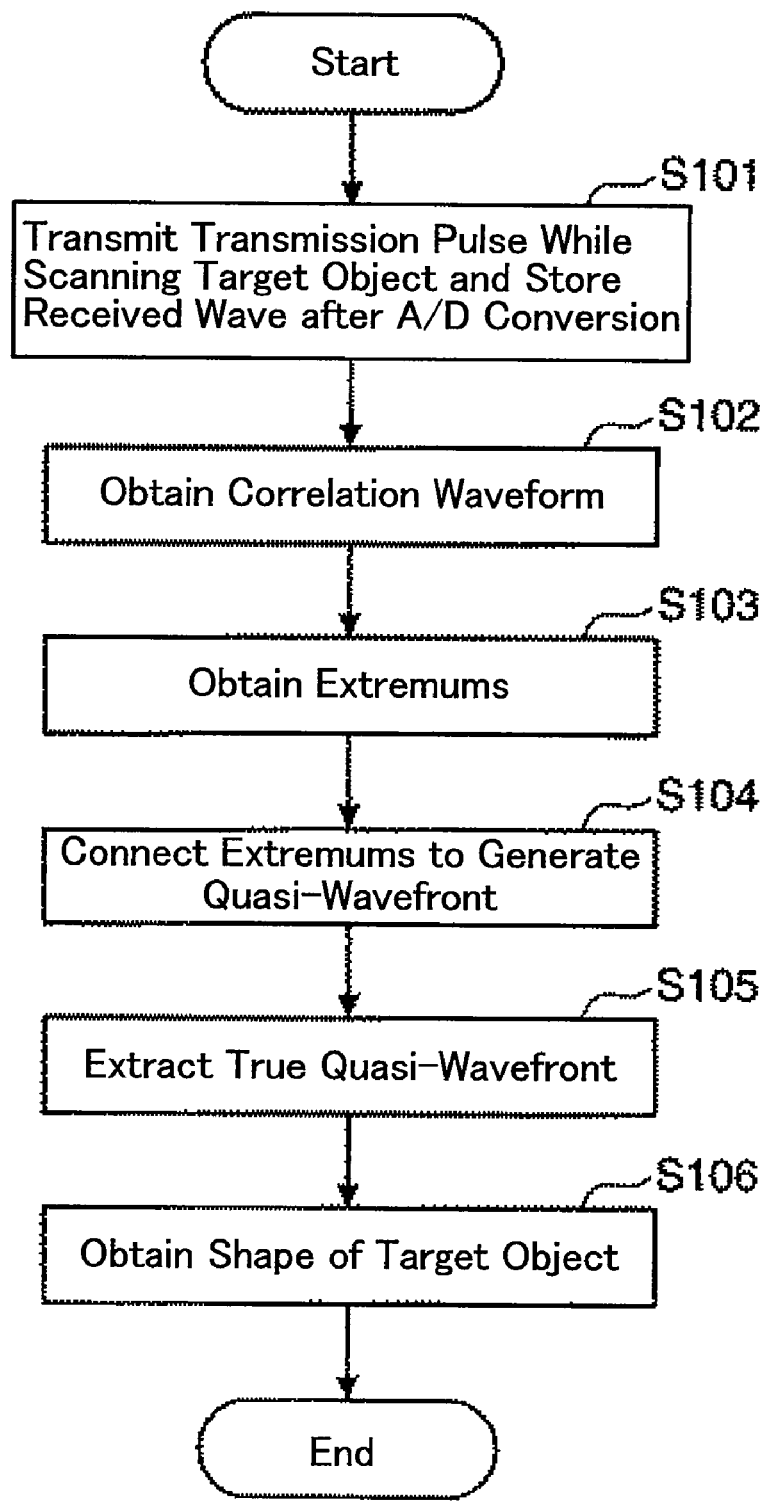
FIG. 17 is a flowchart showing a procedure when a shape of an object is measured by the SEABED method.

Note that FIG. 13 is a diagram showing a received signal including scattered waves. It can be seen that, in FIG. 13, the peaks of the scattered waves can be more clearly confirmed than in FIG. 9, and therefore, the S/I ratio is improved. An estimated shape obtained by the revised SEABED method using this signal is shown in FIG. 14. It can be seen that the measurement accuracy is more improved in FIG. 14 than in FIG. 10.

It was demonstrated that, by selecting the aforementioned codes, the influence of direct waves can be reduced and highly accurate imaging can be achieved.

Although the shape measurement instruments of the second to fourth embodiments each include a large number of transmitters and a single receiver, each shape measurement instrument may include a plurality of transmitters each having a transmitting antenna and a plurality of receivers each having a receiving antenna provided at a location different from those of the transmitters. In this case, if each receiver can receive signals from the plurality of transmitters, the number of combinations of signal paths from a transmitter to a receiver is increased, and therefore, the resolution can be improved. As a result, the total number of receivers and transmitters can be reduced, leading to a further reduction in cost.

Industrial Applicability

The shape measurement instrument and method of the present invention are applicable, as means for avoiding danger or the like, to various apparatuses, such as automobiles, ships, aircrafts, robots and the like.

What is claimed is:

1. A shape measurement instrument comprising:
a plurality of transmitters configured to generate signals expressed as an orthogonal function system or a quasi-orthogonal function system, and radiate the signals having different waveforms or phases;
a receiver configured to receive the signal reflected from a target object;
a correlation unit configured to obtain a correlation waveform of a waveform of the signal received by the receiver and the signal radiated by the transmitter radiating the received signal of the plurality of transmitters; and
a shape estimation unit configured to extract a quasi-wavefront based on a plurality of the correlation waveforms obtained by the correlation unit, and estimate a shape of the target object based on a relationship between the quasi-wavefront and the shape of the target object,
wherein the transmitter has a transmitting antenna configured to transmit the signal,
the receiver has a receiving antenna configured to receive the signal, the receiving antenna being provided at a location different from that of the transmitting antenna,
the location of the transmitting antenna is (2X, 0) and the location of the receiving antenna is (0, 0), a location of a scattering point on a boundary of the target object which contacts an ellipse whose focuses are (2X, 0) and (0, 0) and whose major axis has a length of 2Y is (x, y), and a derivative dY/dX is Y',
the shape estimation unit converts a location relationship (X, Y) between a time delay and the location of the transmitting antenna to the location (x, y) of the scattering point by:

$$x = \frac{(X^2 + Y^2)\dot{Y} - 2XY}{X\dot{Y} - Y} \quad \text{(Expression 16)}$$

$$y = \left|\frac{Y^2 - X^2}{Y - X\dot{Y}}\right|\sqrt{1 - \dot{Y}^2}$$

thereby estimating the shape of the target object.

2. The shape measurement instrument of claim 1, wherein the signal has a fractional bandwidth of 20% or more, the fractional bandwidth being a ratio of an occupied bandwidth to a center frequency.

3. The shape measurement instrument of claim 1, wherein the signal is a UWB signal.

4. The shape measurement instrument of claim 1, wherein the signal is modulated using a PN code which is a pseudonoise sequence.

5. The shape measurement instrument of claim 4, wherein the signal is modulated using an M-sequence code.

6. The shape measurement instrument of claim 5, wherein the plurality of transmitters radiate M-sequence codes having different phases.

7. The shape measurement instrument of claim 4, wherein the signal is modulated using a Gold sequence code.

8. The shape measurement instrument of claim 4, wherein the signal is modulated using a Kasami sequence code.

9. The shape measurement instrument of claim 1, wherein the number of the receivers is one.

10. The shape measurement instrument of claim 1, wherein a plurality of the receivers are provided, and each receiver receives the signals radiated from the plurality of transmitters.

11. A method for measuring a shape using a shape measurement instrument including a plurality of transmitters, a receiver configured to receive a signal reflected from a target object, a correlation unit, and a shape estimation unit, the method comprising the steps of:
(a) radiating signals having different waveforms or phases expressed as an orthogonal function system or a quasi-orthogonal function system by the plurality of transmitters;
(b) receiving the signals reflected from the target object by the receiver;
(c) obtaining a correlation waveform of a waveform of the signal received by the receiver and the signal radiated by the transmitter radiating the received signal of the plurality of transmitters, by the correlation unit;
(d) obtaining extremums of the correlation waveform by the shape estimation unit;
(e) connecting adjacent ones of the extremums to generate a quasi-wavefront by the shape estimation unit;
(f) extracting a true quasi-wavefront from the quasi-wavefront by the shape estimation unit; and
(g) estimating a shape of the target object from the true quasi-wavefront by the shape estimation unit,
wherein the plurality of transmitters each have a transmitting antenna configured to transmit the signal,
the receiver has a receiving antenna configured to receive the signal, the receiving antenna being provided at a location different from that of the transmitting antenna,
the location of the transmitting antenna is (2X, 0) and the location of the receiving antenna is (0, 0), a location of a scattering point on a boundary of the target object which contacts an ellipse whose focuses are (2X, 0) and (0, 0) and whose major axis has a length of 2Y is (x, y), and a derivative dY/dX is Y',
in step (g), the following expression:

$$x = \frac{(X^2 + Y^2)\dot{Y} - 2XY}{X\dot{Y} - Y} \quad \text{(Expression 16)}$$

$$y = \left|\frac{Y^2 - X^2}{Y - X\dot{Y}}\right|\sqrt{1 - \dot{Y}^2}$$

is used to estimate the shape of the target object.

12. The method of claim 11, wherein the signal is modulated using a PN code which is a pseudonoise sequence.

13. The method of claim 11, wherein
the number of the receivers included in the shape measurement instrument is one.

14. The method of claims 11, wherein
the shape measurement instrument includes a plurality of the receivers, and
in step (b), each receiver receives the signals radiated from the plurality of transmitters.

15. The method of claim 12, wherein
the signal is modulated using a Gold sequence code.

16. The method of claim 15, further comprising:
(h) before step (a), selecting a combination of codes which reduces an influence of a direct wave which is transmitted from each of the transmitters and is received by the receiver without via the target object,
wherein, in step (a), the plurality of transmitters transmit the combination of codes selected in step (h).

* * * * *